United States Patent
Carlson et al.

[15] 3,641,706
[45] Feb. 15, 1972

[54] PNEUMATIC COUNTERBALANCERS

[72] Inventors: John H. Carlson, Danvers; Donald L. Mansfield, South Hamilton; Hugh A. Robinson, Wenham, all of Mass.

[73] Assignee: USM Corporation, Flemington, N.J.

[22] Filed: Jan. 14, 1969

[21] Appl. No.: 790,917

[52] U.S. Cl. .................................. 49/324, 16/84, 74/89.15
[51] Int. Cl. ...................................................... E05f 15/02
[58] Field of Search ................... 49/137, 362, 324, 334, 340; 74/89.15, 424.8; 60/52 CO; 16/84

[56] References Cited

UNITED STATES PATENTS

| 3,162,098 | 12/1964 | Lindberg | 74/89.15 X |
| 3,200,664 | 8/1965 | Mauric | 74/424.8 |
| 3,202,009 | 8/1965 | Geyer | 74/424.8 |
| 3,287,758 | 11/1966 | Domas et al. | 16/84 |
| 3,375,908 | 4/1968 | Chaput et al. | 16/84 X |

*Primary Examiner*—J. Karl Bell
*Attorney*—W. Bigelow, Richard A. Wise and Carl E. Johnson

[57] ABSTRACT

A lightweight energy-storing device usable, for example, as a counterweight is disclosed. Thus for instance, on being lifted, a door imparts rotation to a pinion via a rack. This rotation is converted by means of a ball nut screw assembly to linear motion for effecting the compressive stroke of a piston-cylinder assembly charged with gas under pressure, and this compression load is usable to offset the weight of the door.

7 Claims, 3 Drawing Figures

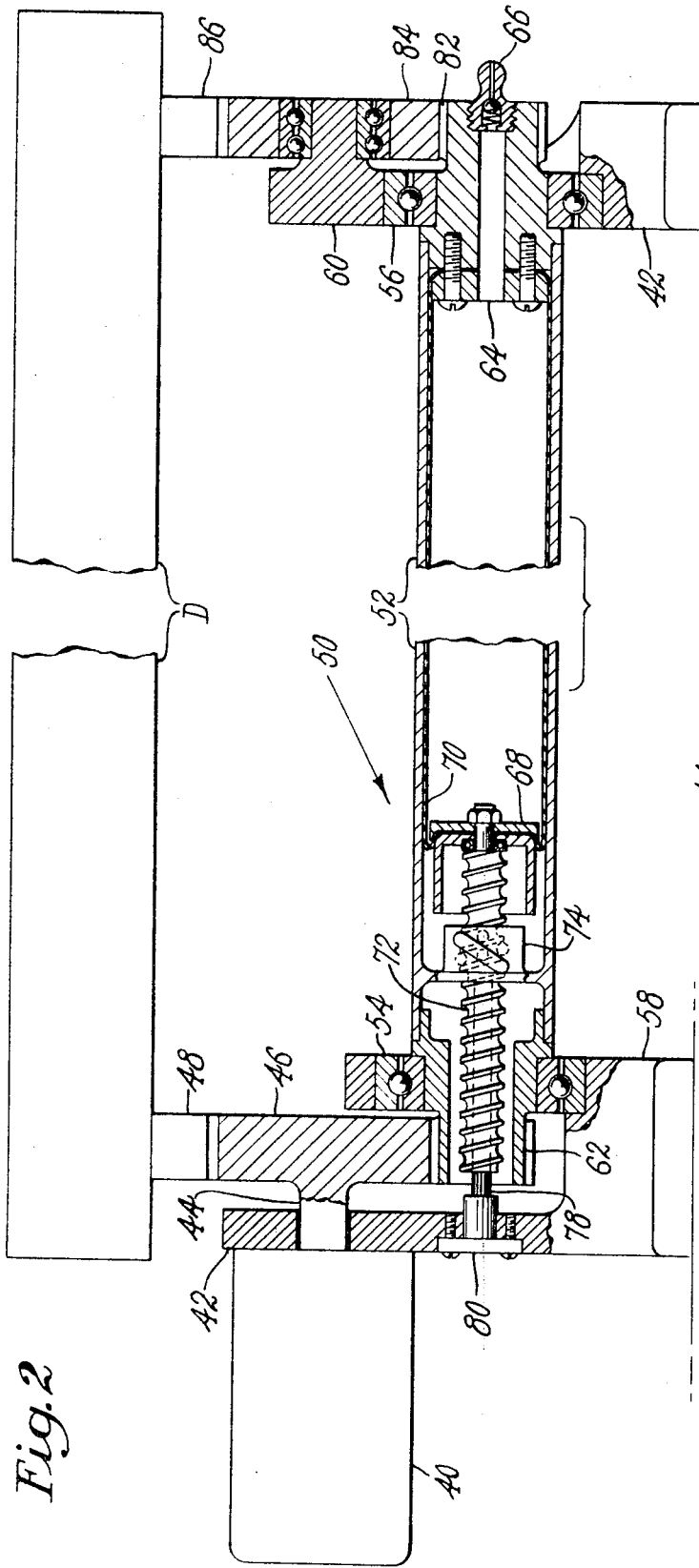
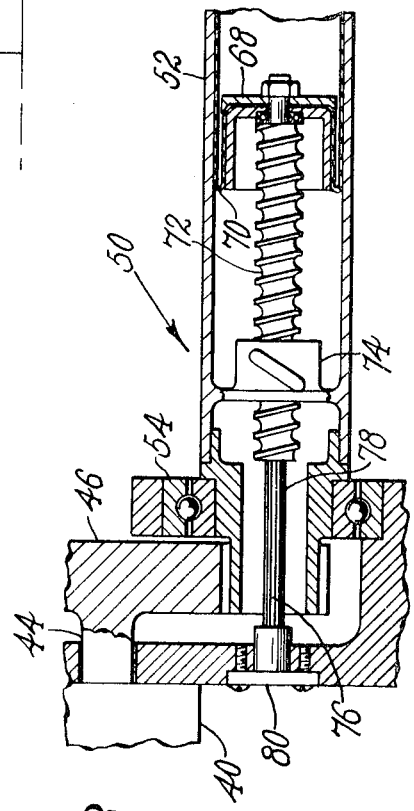
Fig.2
Fig.3

PNEUMATIC COUNTERBALANCERS

BACKGROUND OF THE INVENTION

This invention relates to energy-storing means and more especially to such means employed as counterbalancing devices. The invention in one arrangement is herein illustrated as applied to a power operated door mover, though the invention is not limited thereto.

Door closing and opening mechanisms have hitherto used springs of the elongated tension or torsion type as an aid in effecting door movement. In addition to being cumbersome to mount and requiring considerable space for their operation, cables and pulleys usually associated with the springs of such actuators may jam or become dangerous when subjected to the possibly high forces exerted by the springs and their adaptability as counterbalancers is rather limited.

SUMMARY OF THE INVENTION

It is a main object of this invention to provide a reliable, lightweight, energy-storing means which can serve as a smoothly operating counterbalance, versatile in its application and compact.

A further and more specific object of the invention is to provide an uncomplicated closing mechanism operable through a screw means and having, in closed condition, a fluid pressure-responsive device for facilitating reopening.

In an illustrative arrangement pneumatic balancing of the weight or inertia of an article or mechanism such as a door is established in one position, for instance the open position. Then powered closing of the door provides potential energy in the pressurizing of a chamber by its reciprocable piston, a reaction force thereupon causing the piston to be ready to aid in reopening the door. For controlling linear movement of the piston, a ball screw and nut device is preferably provided, the nut being rotatably driven, and the screw being relatively axially shifted thus to move the piston. A reversible prime mover, for instance an electric motor, is shown as effecting the input motion, the air additionally compressed by the piston during door closure serving to check the action and affording potential energy to assist the motor in reopening the door for instance against the influence of gravity.

BRIEF DESCRIPTION OF THE DRAWINGS

The foregoing and other features of the invention will now be more particularly described in connection with illustrative embodiments, it being understood that the invention is capable of application in many ways and not limited to the exemplary construction herein to be described with reference to the accompanying drawings, in which:

FIG. 2 is an axial section of powered door closing means employing our novel pneumatic counterbalancing mechanism, the parts being in their relative positions at door-open condition; and FIG. 3 is a view similar to a left-hand portion of FIG. 2, the parts now being shown in positions corresponding to energized or door-closed condition.

DESCRIPTION OF THE PREFERRED EMBODIMENTS

Figure 1:
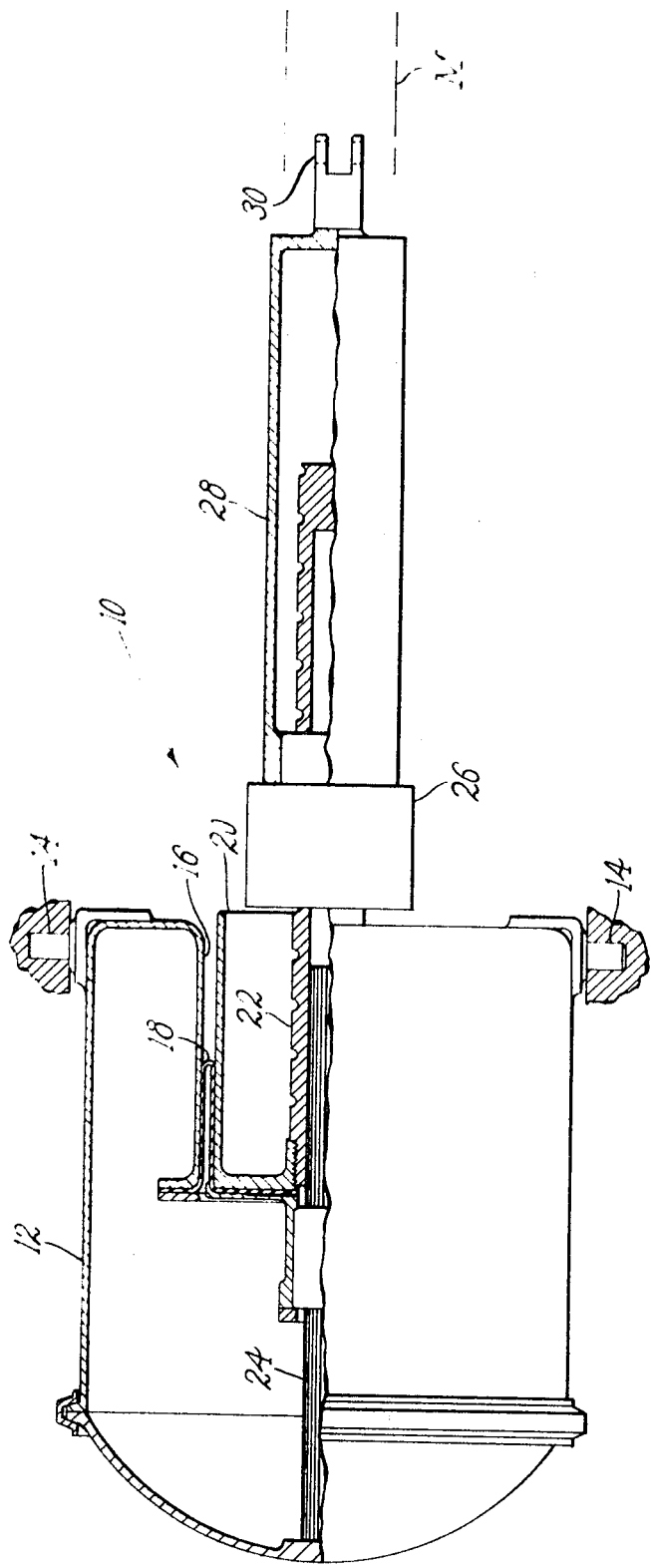
FIG. 1 is a side view partly in axial section of an energy-storing device or counterbalancer according to our invention, an upper quadrant being removed to reveal construction details.

Referring to FIG. 1, a counterbalancer generally designated 10 comprises a cylindrical accumulator 12 preferably mounted on coaxial trunnion pins 14, 14 and having an inturned coaxial cylinder wall 16. Clamped to the flanged inner end of this wall is one end of a flexible rolling diaphragm 18, the other end of which is secured in sealing relation to an axially reciprocable piston 20. The latter is nonrotatably carried on a tubular piston stem externally formed as a screw 22 and internally formed with axial splines for guided telescoping movement on a splined shaft 24 axially fixed in a closed end of the accumulator 12. Though not shown in FIG. 1 it will be understood that the accumulator may be provided with valve means for prepressurizing the chamber if desired for a particular application of the counterbalancer.

For axially working the piston 20 the screw 22 is preferably a ball screw and cooperates with a rotary nonlinearly movable input member in the form of a ball nut 26 secured to a rotatably, coaxial tube 28. This tube is reversibly rotated by any suitable actuating means, for instance manually or by a motor M having its output connected to the tube via a universal coupling 30. It will accordingly be understood that, in operating the actuating means M (manual or otherwise) in one direction to perform a function, its output simultaneously rotates the ball nut 26 and hence causes the piston 20 further to pressurize the accumulator 12 thereby storing potential energy. When reversal of the actuating means is commenced, the compressed fluid in the accumulator is effective to displace the piston 20 to the right as seen in FIG. 1, the low friction of the screwball and nut arrangement reconverting linear motion of the piston to rotation of the tube 28 and thus returning energy or aiding the power means M to restore the initial condition or position of the parts. The relatively few parts of this counterbalancing device insures reliability in use as well as low cost and adaptability to a variety of applications.

FIGS. 2 and 3 show our counterbalancing means as employed, for instance, in lifting and lowering a door D, which may be sectional, curved or of the straight one-piece type. The door D will be vertically guided in suitable means (not shown), and a reversible motor 40 is fixedly mounted as in a door frame structure 42 for controlling elevation of the door. For this purpose a motor output shaft 44 carries a drive gear 46 meshing with a rack 48, longitudinally segmented if necessary affixed to the side of the door D. It will be assumed that in FIG. 2 the door D is in its upper or open position, FIG. 3, showing the lowered door-closed condition. While FIG. 2 further assumes that counterbalancing mechanism, generally designated 50 and next to be described, extends to bridge the door opening, it will be understood that in many instances the mechanism 50 need not be of a length corresponding to the width of the door but may be considerably shorter and employ an accumulator of larger diameter, and may be disposed other than horizontally.

The mechanism 50 comprises a rotary housing or composite tubular cylinder 52 which, as shown, is journaled in axially spaced bearings 54, 56 mounted in bearing brackets 58, 60 respectively secured to the structure 42. The arrangement is such that the drive gear 46 meshes with a tubular pinion 62 constituting one end of the cylinder 52, the other end of this cylinder being fitted with a tubular member 64 (FIG. 2) threadedly receiving a valve 66. Preferably for dynamic balance, and as shown, the member 64 has its outboard periphery formed with gear teeth 82 meshing with an idler gear 84. The latter, like the drive gear 46, meshes with a rack 86 secured on the door D. The valve 66 is adapted to retain air in the cylinder under pressure. Even in the door-open condition as shown in FIG. 2, air confined in the cylinder by a piston 68 and its associated rolling diaphragm 70 is preferably prepressurized to a suitable degree dependent on the checking force required or desired for the particular door and its mechanism.

The piston 68 is operatively controlled by the motor 40 as now will be described. The piston is secured to the inner end of a ball screw 72 coaxially disposed in the cylinder 52 and cooperating with a ball nut 74 mounted for rotation with the cylinder. To guide the piston 68 for axial movement, the screw 72 is held against rotation and is internally formed with axial splines interengaged with corresponding external splines 76 of a stationary shaft 78. The outboard end of this shaft is mounted in a bushing 80 secured to the structure Upon upon energizing the motor 40 to lower the door D the nut 74 will be rotated in a direction to impart axial movement of the nonrotary screw 72 to the right, as indicated in FIG. 2. The diaphragm 70 is accordingly caused by the piston 68 to further compress air in the cylinder and the consequent "air spring"

serves as a door check or damper, the resistance or cushioning effect becoming greater as the door approaches fully closed position. The increased potential energy of this pressure fluid is available at subsequent reversal of the motor drive to reversely rotate the gears 46, 84 and hence to aid in overcoming the influence of gravity as the door is reopened.

Having thus described our invention, what we claim as new and desire to secure by Letters Patent of the United State is:

1. An energy storing and returning means comprising a piston-cylinder device chargeable with gas retainable under pressure, a ball nut screw assembly having one of the ball nut and the screw operatively connected to the piston, and means for preventing rotation of said one of the ball nut and screw, whereby the other of the ball nut and screw is rotatable during relative translation of the piston and its cylinder to modify the pressure in the cylinder of said device in proportion to the displacement of the nut with respect to the screw.

2. A counterbalancer comprising a reversibly rotary power input, a nut operatively connected to the power input for rotation thereby and held against linear movement, a nonrotating screw cooperative with the nut and axially driven thereby, and fluid pressure means responsive to axial movement of the screw in one direction to store energy, the potential energy being returnable to reverse movement of the screw and hence impart reverse output rotation to the nut.

3. A door closing apparatus comprising reversible power means for moving a door between open and closed positions, and a counterbalancing mechanism operatively connected to the power means said mechanism including a piston-cylinder device responsive to fluid pressure developed by movement of the door for checking door movement in one direction, the cylinder of said device having a fully closed end for receiving and retaining the potential energy of fluid pressure cumulative during the door movement in said one direction whereby such energy is thereafter returnable by the piston-cylinder device for facilitating return movement of the door in a direction opposite to said one direction.

4. An apparatus as set forth in claim 3 wherein the power means includes a toothed member in driving relation with the door and with one of the piston means, the cylinder of said piston cylinder device whereby relative axial movement is effected between the piston and said cylinder to pressurize the latter during such movement.

5. An apparatus as set forth in claim 3 wherein the counterbalancing mechanism includes means mounting the piston and cylinder of said device for relative rotation and relative axial movement, and a nut means operatively interconnecting the cylinder and said piston.

6. An apparatus as set forth in claim 3 wherein the counterbalancing mechanism includes a rotatable cylinder, and said piston comprises a ball screw piston stem axially movable in the cylinder, and a nut secured internally to the cylinder is arranged to cooperate with said ball screw piston stem.

7. Apparatus as set forth in claim 6 wherein the piston is provided with a rolling flexible diaphragm having sealing relation with the walls of said cylinder.

* * * * *

PO-1050
(5/69)

UNITED STATES PATENT OFFICE
CERTIFICATE OF CORRECTION

Patent No. 3,641,706        Dated Feb. 15, 1972

Inventor(s) John H. Carlson, Donald Mansfield & Hugh A. Robinson

It is certified that error appears in the above-identified patent and that said Letters Patent are hereby corrected as shown below:

Column 4, Line 11, after "piston" change means to -and-.

Signed and sealed this 13th day of June 1972.

(SEAL)
Attest:

EDWARD M. FLETCHER, JR.
Attesting Officer

ROBERT GOTTSCHALK
Commissioner of Patents